United States Patent
Miyashita

(10) Patent No.: US 10,061,099 B2
(45) Date of Patent: Aug. 28, 2018

(54) LENS DEVICE, IMAGING APPARATUS, AND METHOD OF DETECTING POSITION OF MOVABLE LENS

(71) Applicant: FUJIFILM Corporation, Tokyo (JP)

(72) Inventor: Mamoru Miyashita, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 61 days.

(21) Appl. No.: 15/267,367

(22) Filed: Sep. 16, 2016

(65) Prior Publication Data
US 2017/0003475 A1    Jan. 5, 2017

Related U.S. Application Data

(63) Continuation of application No. PCT/JP2014/079694, filed on Nov. 10, 2014.

(30) Foreign Application Priority Data

Mar. 18, 2014    (JP) ................. 2014-054994

(51) Int. Cl.
*G02B 7/04* (2006.01)
*G02B 7/08* (2006.01)
(Continued)

(52) U.S. Cl.
CPC ............... *G02B 7/04* (2013.01); *G02B 7/026* (2013.01); *G02B 7/08* (2013.01); *G02B 7/10* (2013.01);
(Continued)

(58) Field of Classification Search
CPC . G02B 7/04; G02B 7/10; G02B 7/026; G02B 7/08; G03B 5/02; G03B 2205/0046; G03B 2205/0053
See application file for complete search history.

(56) References Cited

U.S. PATENT DOCUMENTS

2014/0340560 A1    11/2014    Miyashita

FOREIGN PATENT DOCUMENTS

| JP | 1-97911 A | 4/1989 |
|----|-----------|--------|
| JP | 6-58766 A | 3/1994 |

(Continued)

OTHER PUBLICATIONS

English translation of the Written Opinion of the International Searching Authority for PCT/JP2014/079694 (PCT/ISA/237) dated Dec. 16, 2014.

(Continued)

*Primary Examiner* — Joseph P Martinez
(74) *Attorney, Agent, or Firm* — Birch, Stewart, Kolasch & Birch, LLP

(57) ABSTRACT

A lens device includes: a lens that is movable in an optical axis direction; a rotating member that rotates in conjunction with movement of the lens in the optical axis direction; a first signal detection section that detects a signal which changes in accordance with a position of the lens in the optical axis direction; a second signal detection section that detects a signal which changes in accordance with an amount of rotation of the rotating member; a first lens position detection section that detects the position of the lens based on the signal detected by the first signal detection section; a second lens position detection section that detects the position of the lens based on the signal detected by the second signal detection section; and a control section as defined herein.

6 Claims, 12 Drawing Sheets

(51) Int. Cl.
    *H04N 5/232*     (2006.01)
    *G02B 7/02*     (2006.01)
    *G03B 5/02*     (2006.01)
    *G02B 7/10*     (2006.01)
    *H04N 5/225*     (2006.01)

(52) U.S. Cl.
    CPC .............. *G03B 5/02* (2013.01); *H04N 5/2253* (2013.01); *H04N 5/2254* (2013.01); *H04N 5/23203* (2013.01); *H04N 5/23209* (2013.01); *H04N 5/23293* (2013.01); *G03B 2205/0046* (2013.01); *G03B 2205/0053* (2013.01); *H04N 5/225* (2013.01)

(56) References Cited

FOREIGN PATENT DOCUMENTS

| | | | |
|---|---|---|---|
| JP | 7-230031 A | 8/1995 | |
| JP | 2000-28893 A | 1/2000 | |
| JP | 2005-284149 | * 10/2005 | .............. G02B 7/08 |
| JP | 2005-284149 A | 10/2005 | |
| JP | 2006-259520 A | 9/2006 | |
| JP | 2007-178798 A | 7/2007 | |
| JP | 2011-64972 A | 3/2011 | |
| WO | WO 2013/114705 A1 | 8/2013 | |

OTHER PUBLICATIONS

International Search Report for PCT/JP2014/079694 dated Dec. 16, 2014.

Written Opinion of the International Searching Authority for PCT/JP2014/079694 (PCT/ISA/237) dated Dec. 16, 2014.

Chinese Office Action and Search Report, dated Jan. 10, 2018, for corresponding Chinese Application No. 201480077238.2, with an English translation of the Office Action only.

* cited by examiner

LENS DEVICE, IMAGING APPARATUS, AND METHOD OF DETECTING POSITION OF MOVABLE LENS

CROSS REFERENCE TO RELATED APPLICATION

This is a continuation of International Application No. PCT/JP2014/079694 filed on Nov. 10, 2014, and claims priority from Japanese Patent Application No. 2014-054994 filed on Mar. 18, 2014, the entire disclosures of which are incorporated herein by reference.

BACKGROUND OF THE INVENTION

1. Field of the Invention

The present invention relates to a lens device, an imaging apparatus having the same, and a method of detecting a position of a movable lens mounted on the lens device.

2. Description of the Related Art

In recent years, there has been progress in an increase in resolution and an increase in size of screen such as a television or a monitor, and there has been an increase in the demand for an increase in image quality of a video to be displayed. In order to cope with the demand for an increase in image quality, a lens device for movies, broadcasting, and the like has been equipped with a position detection device capable of detecting the position of a movable lens such as a zoom lens with a high accuracy. In such a manner, an increase in performance of lens control is achieved.

As the position detection device, there is a device that directly detects movement of the movable lens in the optical axis direction and detects the position of the movable lens (refer to JP1989-97911A (JP-H01-97911A)). Further, there is a device that detects movement of a rotating member rotating about the optical axis in conjunction with movement of the movable lens and detects a position of the movable lens (refer to WO2013/114705A).

The lens device described in WO2013/114705A is provided with two magnetic recording members for a rotating barrel that rotates in accordance with movement of the zoom lens. The lens device detects an A phase signal, which corresponds to a magnetic signal having a first wavelength recorded in one magnetic recording member, and a B phase signal, of which the phase deviates from that of the A phase signal, and detects a C phase signal, which corresponds to a magnetic signal having a second wavelength recorded in the other magnetic recording member and different from the first wavelength, and a D phase signal of which the phase deviates from that of the C phase signal. Thereby, the lens device calculates a phase difference between the A phase and the C phase by using the A B CD phase signals, and detects the position of the zoom lens based on the phase difference.

Further, a device that detects the position of a movable lens through the combined use of a potentiometer, which directly detects movement of the movable lens in the optical axis direction, and a photointerrupter which detects movement of a rotation plate rotating in conjunction with the movement of the movable lens has been also proposed (refer to JP1995-230031A (JP-H07-230031A)).

In the device described in JP1995-230031A (JP-H07-230031A), the accuracy in position detection is improved by correcting the position of the movable lens, which is detected by the potentiometer, based on the signal detected by the photointerrupter.

SUMMARY OF THE INVENTION

In a zoom-compatible digital camera, based on a position of the zoom lens detected after power is supplied, generally control for correcting chromatic aberration or displaying a current zoom position on a display section is performed. Hence, if imaging is intended to be started, after power is supplied, first, it is necessary to detect the position of the zoom lens.

The lens described in WO2013/114705A detects the position of the zoom lens based on the ABCD phase signals. Thus, if an accurate position is intended to be detected, after power is supplied to the lens device, it is necessary to rotate the rotating barrel by a certain degree.

On the other hand, a position detection device described in JP1989-97911A (JP-H01-97911A) or JP1995-230031A (JP-H07-230031A) is able to detect the position of the zoom lens immediately after power is supplied to the lens device, due to a configuration where the potentiometer directly detects the position of the lens.

At the time of correcting the above-mentioned chromatic aberration or displaying the zoom position, it is not necessary for the resolving power for detection of the position of the zoom lens to be so high. However, in a manner similar to that of slow zooming or the like, in a case of minutely controlling the zoom lens position, it is necessary for the resolving power for detection of the position of the zoom lens to be high.

The position detection device described in JP1989-97911A (JP-H01-97911A) or JP1995-230031A (JP-H07-230031A) is able to detect the zoom lens position immediately after power is supplied. However, the potentiometer having a low resolving power detects the position of the zoom lens, and thus this configuration cannot be compatible with slow zooming or the like. It is preferable to use a potentiometer having a high resolving power, but in this case, a complex wire is formed in a lens barrel housing a movable lens. Further, it is not possible to avoid an increase in size of the lens device.

The present invention has been made in consideration of this situation. An object of the invention is to provide a low-cost lens device capable of detecting the position of the movable lens without moving the movable lens after power is supplied and achieving high imaging performance, an imaging apparatus having the same, and a method of detecting the position of the movable lens.

According to the present invention, there is provided a lens device comprising: a lens that is movable in an optical axis direction; a rotating member that rotates in conjunction with movement of the lens in the optical axis direction; a first signal detection section that detects a signal which changes in accordance with a position of the lens in the optical axis direction; a second signal detection section that detects a signal which changes in accordance with an amount of rotation of the rotating member; a first lens position detection section that detects the position of the lens based on the signal detected by the first signal detection section; a second lens position detection section that detects the position of the lens based on the signal detected by the second signal detection section; and a control section that performs first control for outputting information of the position of the lens, which is detected by the first lens position detection section, and thereafter performs second control for outputting information of the position of the lens, which is detected by the second lens position detection section, after the rotating member rotates, if power is supplied.

According to the present invention, there is provided an imaging apparatus comprising: the lens device; and an imaging element that captures an image of a subject through the lens device.

According to the present invention, there is provided a method of detecting a position of a movable lens, the method comprising: a first signal detection step of detecting a signal changing in accordance with a position of a lens which is mounted on a lens device and is movable in an optical axis direction; a second signal detection step of detecting a signal changing in accordance with an amount of rotation of a rotating member which rotates in conjunction with movement of the lens in the optical axis direction; a first lens position detection step of detecting the position of the lens based on the signal detected in the first signal detection step; a second lens position detection step of detecting the position of the lens based on the signal detected in the second signal detection step; and a control step of performing first control for outputting information of the position of the lens, which is detected in the first lens position detection step, and thereafter performing second control for outputting information of the position of the lens, which is detected in the second lens position detection step, after the rotating member rotates, if power is supplied to the lens device.

According to the present invention, it is possible to provide a low-cost lens device capable of detecting the position of the movable lens without moving the movable lens after power is supplied and achieving high imaging performance, an imaging apparatus having the same, and a method of detecting the position of the movable lens.

DESCRIPTION OF THE PREFERRED EMBODIMENTS

Hereinafter, embodiments of the present invention will be described with reference to drawings.

Figure 1:
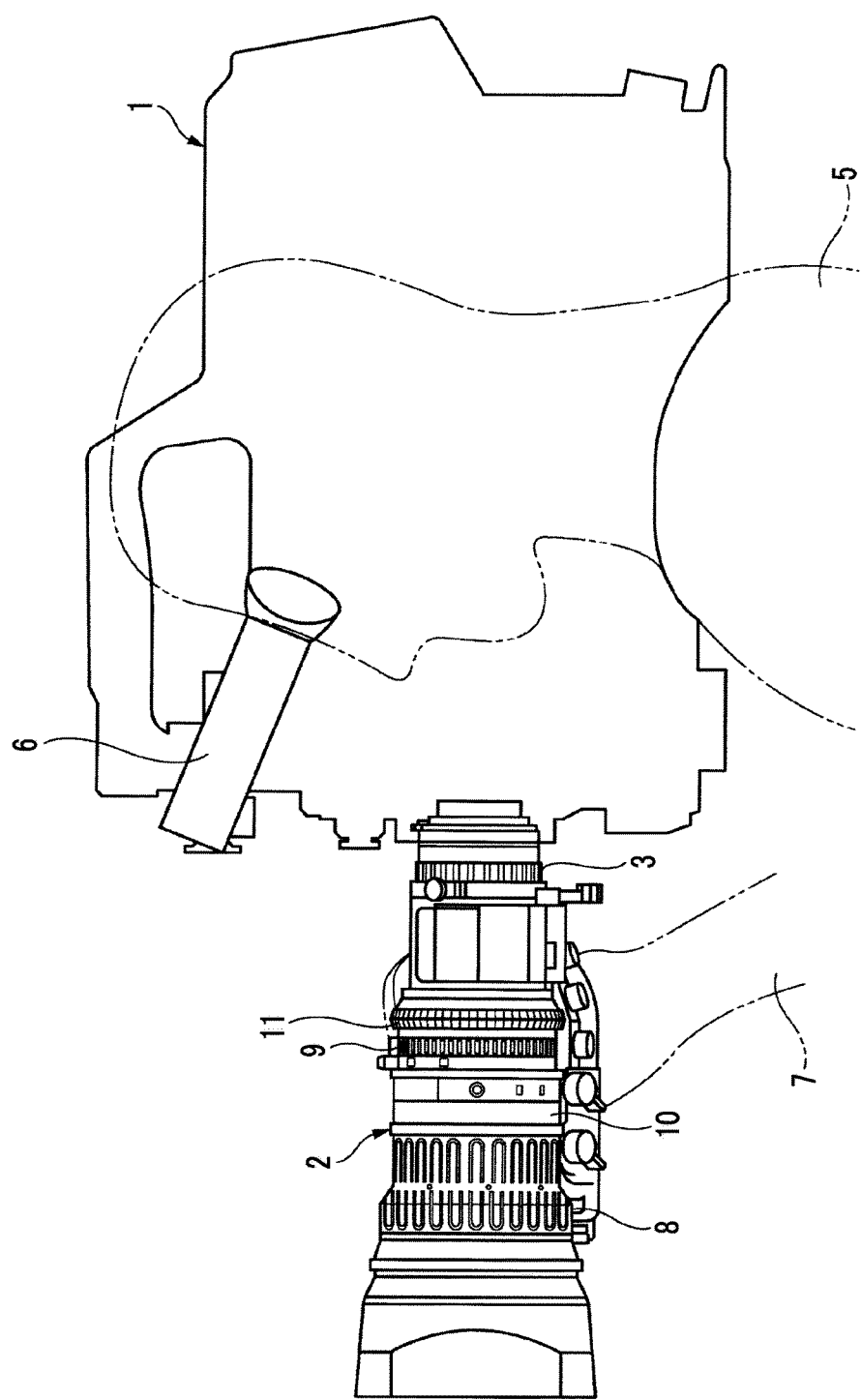
FIG. 1 is an external view of an imaging apparatus equipped with a lens device 2 according to an embodiment of the present invention.

FIG. 1 is an external view of an imaging apparatus equipped with a lens device 2 according to an embodiment of the present invention. The lens device 2 is mounted on the front part of an imaging apparatus 1.

The lens device 2 comprises a housing 10 having a barrel shape such as a cylinder shape. A photography lens such as a zoom lens or a focus lens and a diaphragm device capable of adjusting an aperture amount are built into the housing 10. A mount section 3 is provided on the base of the housing 10 of the lens device 2. A connection portion of the mount section 3 is detachably mounted on a lens mount portion which is provided on the front part of the imaging apparatus 1, whereby the lens device 2 is fixed onto the imaging apparatus 1.

In the imaging apparatus 1, an imaging element is disposed on the optical axis of the lens device 2 in a state where the lens device 2 is mounted. Then, the imaging element captures an optical image for which light is concentrated through the lens device 2. The output signal of the imaging element is processed by an image processing section built into the imaging apparatus 1, whereby various types of image data are generated.

A photographer 5 looks into a viewfinder device 6, for example, with a right eye while carrying the imaging apparatus 1 on a right shoulder. Then, the photographer 5 captures an image of a subject while fixing the imaging apparatus by holding a gripper of the lens device 2 with a right hand 7.

A focus ring 8, which adjusts a focus position of a focus lens, is provided to be rotatable around the outer circumference of the lens device 2 on the lens front end side (subject side) of the lens device 2. The photographer 5 may manually rotate the focus ring 8 at an arbitrary angle so as to adjust the focus position.

In the middle part of the lens device 2, a zoom ring 9, which adjusts a zoom position of a zoom lens, is provided to be rotatable around the outer circumference of the lens device 2. The photographer 5 may manually rotate the zoom ring 9 at an arbitrary angle so as to adjust a zoom ratio.

In the lens device 2, an iris ring 11, which is for adjusting an aperture amount of a diaphragm device, is provided on a side of the zoom ring 9 close to the imaging apparatus 1. The iris ring 11 is provided to be rotatable around the outer circumference of the lens device 2.

Figure 2:
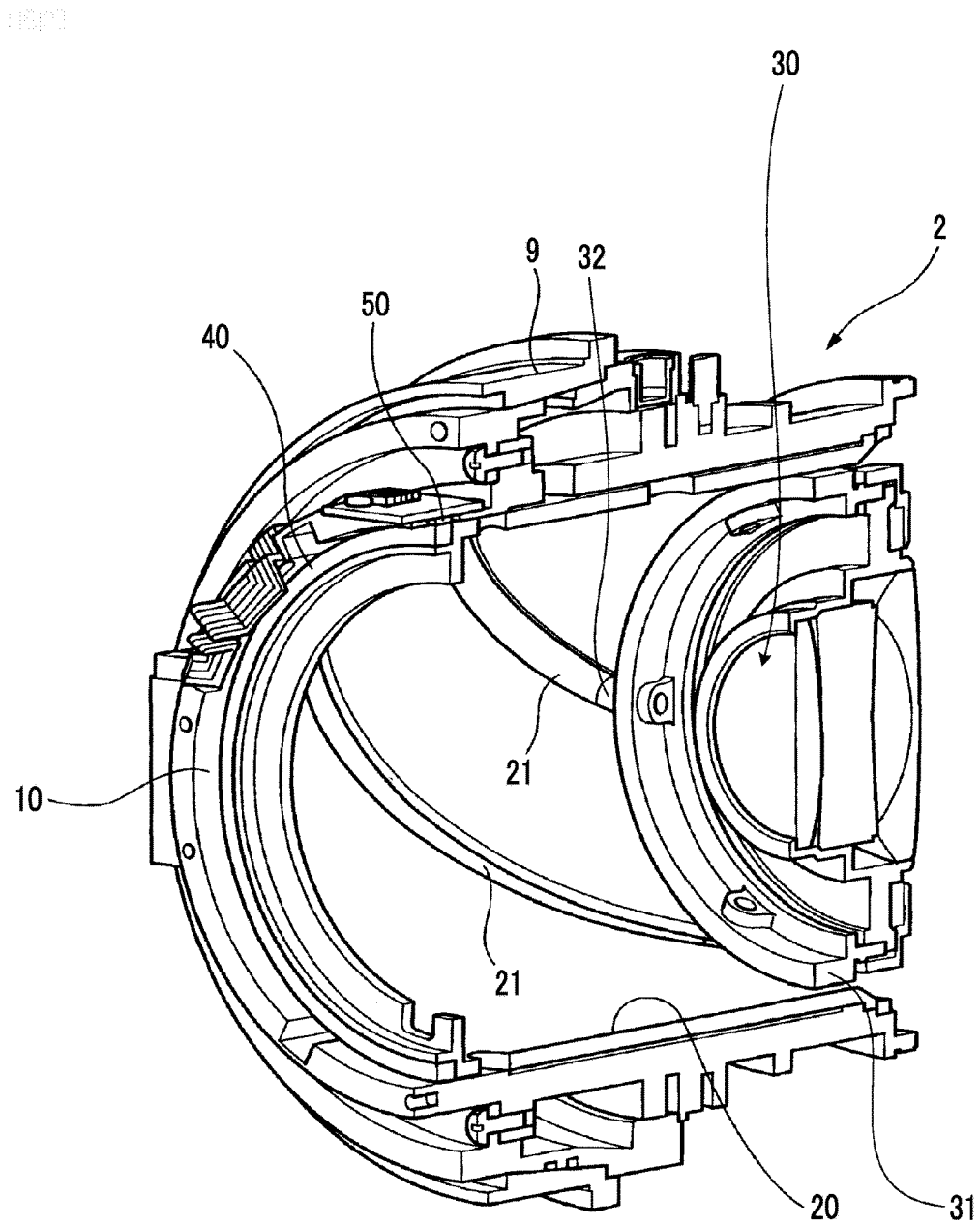
FIG. 2 is a perspective view of a cross-section in the vicinity of a zoom ring 9 of the lens device 2 shown in FIG. 1.

FIG. 2 is a perspective view of a cross-section in the vicinity of the zoom ring 9 of the lens device 2 shown in FIG. 1.

In the housing 10 having the zoom ring 9 provided on the outer circumference thereof, a rotating barrel 20 and a zoom lens holding section 31 are provided. The rotating barrel 20 serves as a rotating member that is able to rotate about the optical axis of the lens device 2. The zoom lens holding section 31 holds a zoom lens 30 serving as a lens that is provided in the rotating barrel 20 and is movable in the optical axis direction.

The rotating barrel 20 rotates by rotating the zoom ring 9, and the zoom lens holding section 31 moves in the optical axis direction of the lens device 2 in conjunction of the rotation.

The rotating barrel 20 has a cam groove 21 for converting the rotation into linear motion of the zoom lens holding section 31. A protrusion portion 32 of the zoom lens holding section 31 is engaged with the cam groove 21 so as to be movable. Accordingly, if the zoom lens holding section 31 moves in the optical axis direction, the rotating barrel 20 rotates about the optical axis in accordance with the movement. In description of the present embodiment, the rotating barrel 20 is able to rotate by 300 degrees, for example.

A magnetic recording member 40, which extends along a direction of the rotation of the rotating barrel 20, is disposed to be fixed onto the outer circumference of the rotating barrel 20. The magnetic recording member 40 records a magnetic signal through magnetization. In the present embodiment, the magnetic recording member 40 having an annular shape may be used, but the magnetic recording member 40 having not only the annular shape but also a linear shape with a length corresponding to an angle by which the rotating barrel 20 is rotatable may be used.

A magnetic sensor section 50 is disposed to be fixed onto the inner surface of the housing 10 at a position where the magnetic sensor section 50 faces the magnetic recording member 40.

Figure 3:
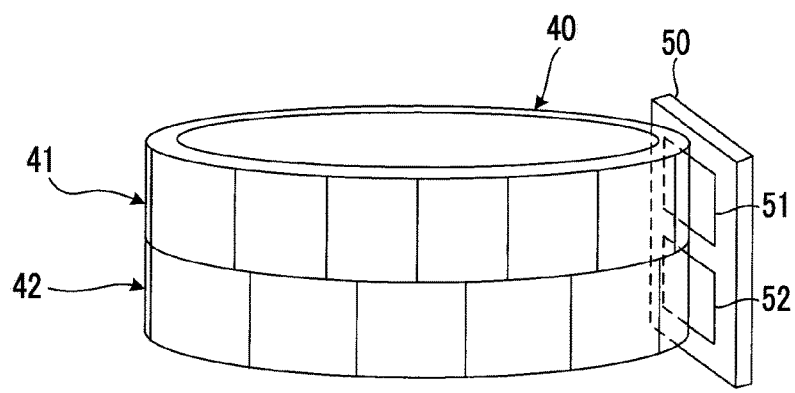
FIG. 3 is a partially enlarged view of a magnetic recording member 40 shown in FIG. 2 and a magnetic sensor section 50 facing thereto.
Figure 4:
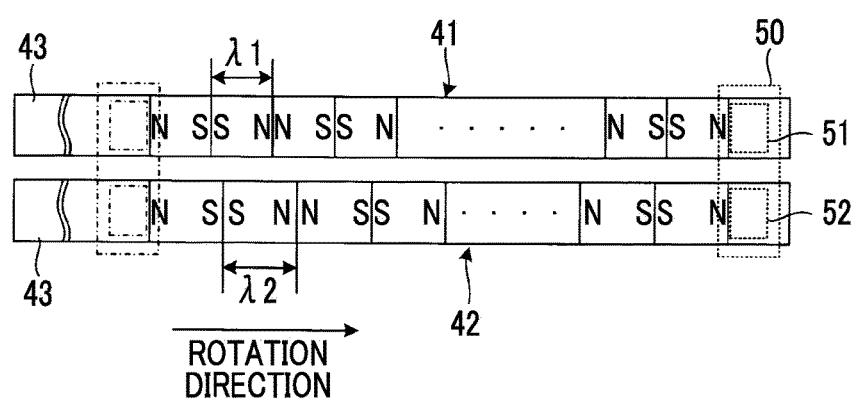
FIG. 4 is a development view of the magnetic recording member 40 shown in FIG. 2.

FIG. 3 is a partially enlarged view of the magnetic recording member 40 shown in FIG. 2 and the magnetic sensor section 50 facing thereto. FIG. 4 is a development view of the magnetic recording member 40 shown in FIG. 2.

As shown in FIG. 3, the magnetic recording member 40 is configured such that a magnetic recording member 41 and a magnetic recording member 42 overlap.

In the magnetic recording member 41, information about a sine wave having a wavelength $\lambda 1$ is recorded as a magnetic signal. In the magnetic recording member 42, information about a sine wave having a wavelength $\lambda 2$ longer than a wavelength $\lambda 1$ is recorded as a magnetic signal.

The magnetic sensor section 50 comprises a magnetic sensor 51 that is disposed at a position where it faces the magnetic recording member 41, and a magnetic sensor 52 that is disposed at a position where it faces the magnetic recording member 42.

The magnetic sensor 51 has two magneto-resistance effect elements of which electrical resistances change in accordance with the applied magnetic field, and detects the sine wave signal having the wavelength kJ and a cosine wave signal of which a phase deviates by for example 90°, from the magnetic information in which the magnetic recording member 41 is recorded, and outputs the signals.

The magnetic sensor 52 has two magneto-resistance effect elements of which electrical resistances change in accordance with the applied magnetic field, and detects the sine wave signal having the wavelength $\lambda 2$ and the cosine wave signal of which the phase deviates by for example 90°, from the magnetic information in which the magnetic recording member 42 is recorded, and outputs the signals.

Each of the magnetic recording member 41 and the magnetic recording member 42 includes multiple magnetization sections (in the drawing, blocks each of which has both ends indicated by S and N) which are arranged without gaps along the direction of the rotation of the rotating barrel 20. Each magnetization section is a region in which a magnetic signal is recorded.

A width (a width in the direction of the rotation of the rotating barrel 20) of each magnetization section of the magnetic recording member 41 is $\lambda 1$. In contrast, a width (a width in the direction of the rotation of the rotating barrel 20) of each magnetization section of the magnetic recording member 42 is $\lambda 2$ which is greater than $\lambda 1$. Contrary to this, the width of the magnetization section of the magnetic recording member 41 may be greater than the width of the magnetization section of the magnetic recording member 42.

In FIG. 4, the dashed line indicates the position of the magnetic sensor section 50 relative to the magnetic recording member 40 when an angle of rotation of the rotating barrel 20 is 0° (for example, zoom lens 30 is at the wide-angle end). If the rotating barrel 20 rotates, the position of the magnetic sensor section 50 indicated by the dashed line of FIG. 4 shifts in the left direction of the drawing. Then, when the angle of rotation is 300°, the magnetic sensor section 50 is at a position indicated by the chain line of FIG. 4.

Figure 5:
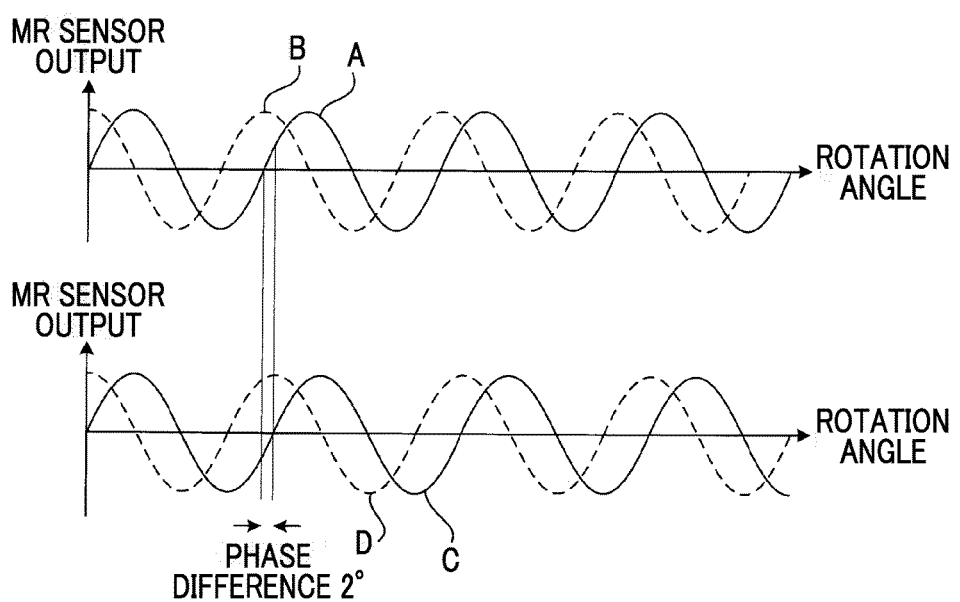
FIG. 5 is a diagram illustrating signal waveforms which are output from the magnetic sensor section 50 when a rotating barrel 20 shown in FIG. 2 is rotating.

FIG. 5 is a diagram illustrating signal waveforms which are output from the magnetic sensor section 50 when a rotating barrel 20 shown in FIG. 2 is rotated. The horizontal axis of FIG. 5 indicates an angle of rotation (amount of rotation) of the rotating barrel 20.

The waveforms (hereinafter referred to as an A phase and a B phase) indicated by the reference signs A and B of FIG. 5 are signal waveforms which are output from the magnetic sensor 51 facing the magnetic recording member 41. The B phase deviates by 90° from the A phase.

The waveforms (hereinafter referred to as a C phase and a D phase) indicated by the reference signs C and D of FIG. 5 are signal waveforms which are output from the magnetic sensor 52 facing the magnetic recording member 42. The C phase is the same as the A phase at the beginning, but advances to be faster by 2° than the A phase for each one cycle (one pulse). Further, the D phase is a signal that deviates by 90° from the C phase.

In the present embodiment, while the rotating barrel 20 rotates by 300°, the magnetic recording members 41 and 42 perform magnetization such that, from the magnetic sensor section 50, the A and B phases are output by 150 pulses and the C and D phases are output by 149 pulses.

In such a manner, the magnetic sensor section 50 functions as a second signal detection section that detects a signal changing in accordance with the amount of rotation of the rotating barrel 20.

Figure 6:
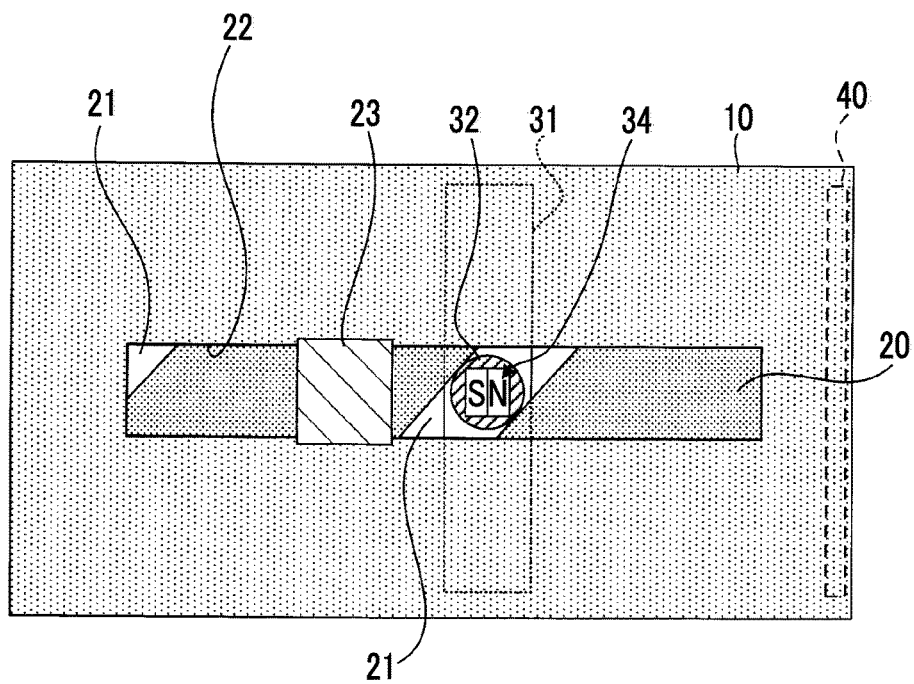
FIG. 6 is a side view of a housing 10 as viewed from a direction opposite to the cross-section side of FIG. 2.

FIG. 6 is a side view of the housing 10 as viewed from a direction opposite to the cross-section side of FIG. 2.

The housing 10 is provided with an opening 22 having a linear shape which is longitudinal in the optical axis direction of the zoom lens 30. When the zoom lens holding section 31 moves in the optical axis direction, the opening 22 is provided along a region, through which the protrusion portion 32 provided on the zoom lens holding section 31 passes, at a position where the opening 22 faces the region.

A Hall IC 23 is provided on the outer circumference of the housing 10 so as to cover a part of the opening 22. The Hall IC 23 is fixed at a position where it faces the opening 22.

A magnet 34, of which the S and N poles are aligned in the optical axis direction, is provided at the front end of the protrusion portion 32 of the zoom lens holding section 31.

The Hall IC 23 is a non-contact magnetic sensor that converts magnetic field generated from the magnet 34 into an electrical signal by using the Hall effect and outputs the signal.

Figure 7:
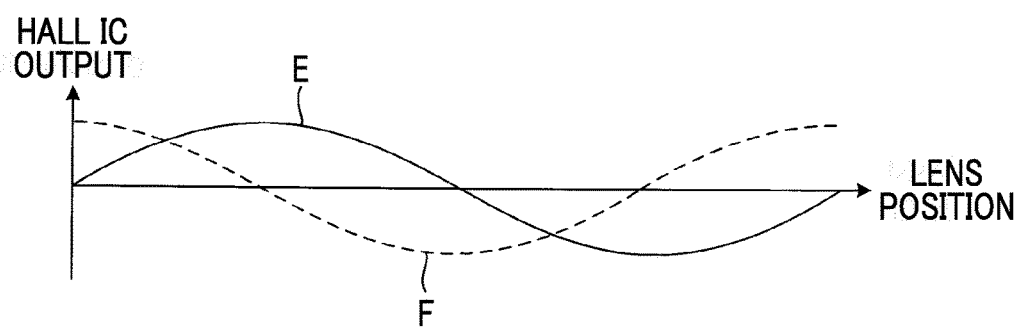
FIG. 7 is a diagram illustrating a signal waveform which is output from a Hall IC 23 when the rotating barrel 20 is rotating.

FIG. 7 is a diagram illustrating a signal waveform which is output from a Hall IC 23 when the rotating barrel 20 is being rotated.

The waveforms (hereinafter referred to as an E phase and an F phase) indicated by the reference signs E and F of FIG. 7 are signal waveforms which are output from the Hall IC 23. The F phase deviates by 90° from the E phase. The horizontal axis of FIG. 7 indicates the position of the zoom lens 30 in the optical axis direction.

As described above, the Hall IC 23 functions as a first signal detection section that detects a signal changing in accordance with the position of the zoom lens 30 in the optical axis direction.

Figure 8:
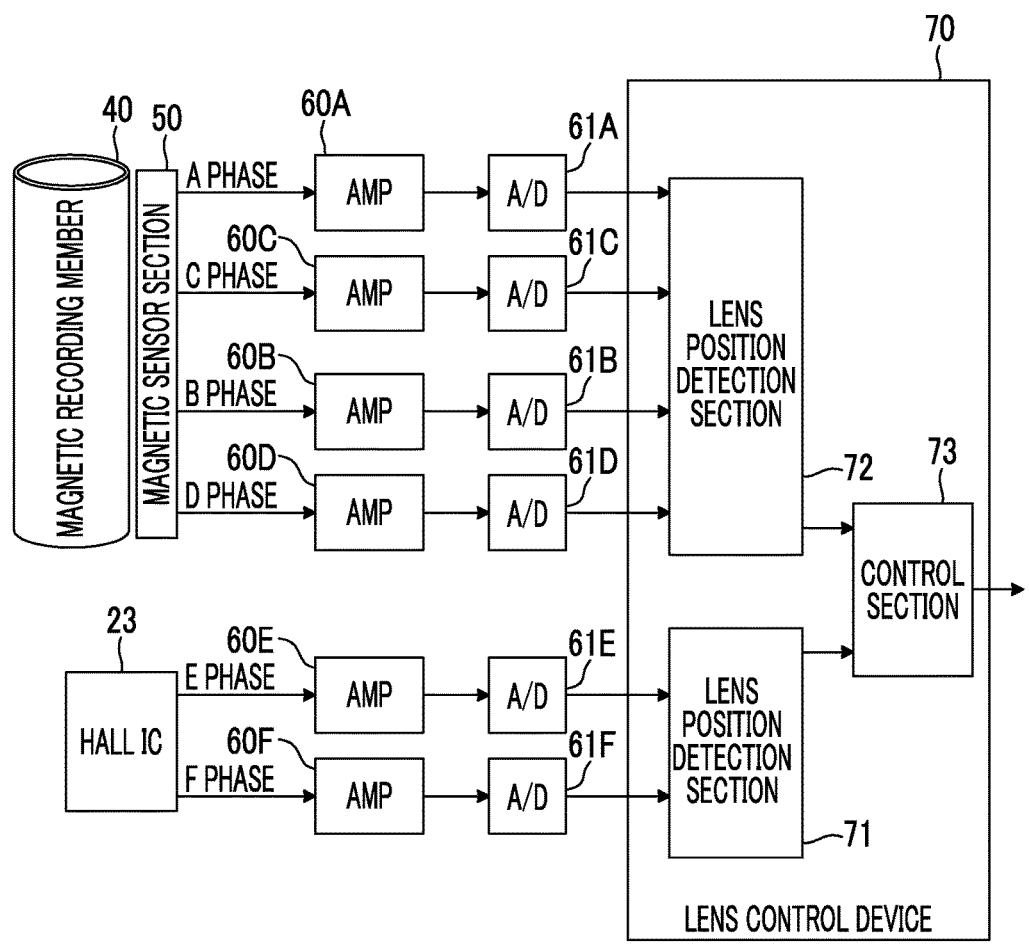
FIG. 8 is a block diagram illustrating an internal configuration of the lens device 2 that detects the position of the zoom lens 30 shown in FIG. 2.

FIG. 8 is a block diagram illustrating an internal configuration of the lens device 2 that detects the position of the zoom lens 30 shown in FIG. 2.

The lens device 2 comprises amplifiers 60A, 60B, 60C, 60D, 60E, and 60F, A/D converters 61A, 61B, 61C, 61D, 61E, and 61F, and a lens control device 70.

The amplifier 60A amplifies the A phase signal which is output from the magnetic sensor section 50. The amplifier 60B amplifies the B phase signal which is output from the magnetic sensor section 50. The amplifier 60C amplifies the C phase signal which is output from the magnetic sensor section 50. The amplifier 60D amplifies the D phase signal which is output from the magnetic sensor section 50. The amplifier 60E amplifies the E phase signal which is output from the Hall IC 23. The amplifier 60F amplifies the F phase signal which is output from the Hall IC 23.

The A/D converter 61A converts the A phase signal, which is amplified by the amplifier 60A, into a digital signal by sampling the signal with a predetermined interval. The A/D converter 61B converts the B phase signal, which is amplified by the amplifier 60B, into a digital signal by sampling the signal with a predetermined interval. The A/D converter 61C converts the C phase signal, which is amplified by the amplifier 60C, into a digital signal by sampling the signal with a predetermined interval. The A/D converter 61D converts the D phase signal, which is amplified by the amplifier 60D, into a digital signal by sampling the signal with a predetermined interval. The A/D converter 61E converts the E phase signal, which is amplified by the amplifier 60E, into a digital signal by sampling the signal with a predetermined interval. The A/D converter 61F converts the F phase signal, which is amplified by the amplifier 60F, into a digital signal by sampling the signal with a predetermined interval.

The lens control device 70 comprises: a first lens position detection section 71 that detects the position of the zoom lens 30 based on the E phase signal and the F phase signal; a second lens position detection section 72 that detects the position of the zoom lens 30 based on the A phase signal, the B phase signal, the C phase signal, and the D phase signal; and a control section 73.

The lens control device 70 includes a processor as a main component. Thus, the first lens position detection section 71, the second lens position detection section 72, and the control section 73 are functional blocks which are implemented by causing the processor to execute programs stored in a memory.

The first lens position detection section 71 calculates a phase difference θ1 between the E and F phases, based on the E phase signal and the F phase signal which are output from the A/D converters 61E and 61F at arbitrary timing. For example, by calculating arctan(E/F) (E and F are signal levels of the respective phases which are acquired at arbitrary timing), the phase difference θ1 is calculated.

A relationship between the phase difference θ1 and the position of the zoom lens 30 is acquired through actual measurement at the time of manufacturing the lens device 2, and the acquired data is stored in the memory of the lens control device 70. Hence, if the phase difference θ1 can be calculated, the position of the zoom lens corresponding thereto can be detected from the data of the memory.

The second lens position detection section 72 calculates a phase difference θ2 between the A and C phases, based on the A, B, C, and D phase signals, which are output from the A/D converters 61A to 61D, at arbitrary timing (timing at which any phase of the A, B, C, and D phases is 0° or 180°. For example, by calculating arctan(A/B)−arctan(C/D) (A, B, C, and D are signal levels of the respective phases which are acquired at arbitrary timing), the phase difference θ2 is calculated.

The reason why the position of the zoom lens 30 is detected based on the A, B, C, and D phase signals at timing, at which any phase of the A, B, C, and D phases is 0° or 180°, is because an error in the phase difference θ2 obtained at this timing relative to a designed value is minimized.

A relationship between the phase difference θ2 and the position of the zoom lens 30 is acquired through actual measurement at the time of manufacturing the lens device 2, and the acquired data is stored in the memory of the lens control device 70. Hence, if the phase difference θ2 can be calculated, the position of the zoom lens corresponding thereto can be detected from the data of the memory.

Further, the second lens position detection section 72 detects the position of the zoom lens 30 based on the phase difference θ2, and thereafter sets the position to a reference position. Then, if the zoom ring 9 is rotated, a direction of movement of the zoom lens 30 is determined by comparing the A phase signal which is output from the amplifier 60A and the B phase signal which is output from the amplifier 60B, the number of pulses (each division part, which is obtained when a sin wave or a cosine wave is multiplied, is a single pulse) of the A phase signal or the B phase signal is counted, and a distance (amount of positional displacement) corresponding to the number of pulses counted is added to or subtracted from the reference position, whereby the position of the zoom lens 30 is detected.

In addition, the second lens position detection section 72 may detect the amount of displacement of the reference position by determining the direction of the movement of the zoom lens 30 by comparing the C phase signal and the D phase signal and counting the number of pulses of the C phase signal or D phase signal.

In such a manner, the second lens position detection section 72 detects the position of the zoom lens 30 with high resolving power through processing of respectively multiplying two phase signals subjected to counting of the number of pulses.

The first lens position detection section 71 detects the position of the zoom lens 30 by using only arctan(E/F). Hence, as compared with the second lens position detection section 72, the position detection resolving power is low. About 1/100 of the detection resolving power of the first lens position detection section 71 is sufficient. The reason for this will be described later. On the other hand, the detection resolving power of the second lens position detection section 72 may be set to about 1/10000 so as to deal with slow zooming or the like.

The second lens position detection section 72 detects the position of the zoom lens 30 based on the A, B, C, and D phase signals at the timing at which any phase of the A, B, C, and D phases is 0° or 180°. Accordingly, until any phase of the A, B, C, and D phases reaches 0° or 180°, it is necessary for the zoom lens 30 to be moved by rotating the zoom ring 9.

In contrast, the first lens position detection section 71 detects the position of the zoom lens 30 based on the E phase signal and the F phase signal at arbitrary timing. Accordingly, even though the zoom ring 9 is not rotated, it is possible to detect the position of the zoom lens 30.

In addition, also by using the A, B, C, and D phase signals at timing at which any phase of the A, B, C, and D phases is not 0° or 180°, the phase difference θ2 is calculated, and therefore the position of the zoom lens 30 can be detected. However, in this case, an error in the phase difference θ2 is large, and thus reliability of the detected position of the zoom lens 30 is low.

The error in the phase difference θ2 occurs due to the following reason. The A, B, C, and D phase signals cannot be obtained from a result of detection which is directly performed on the position of the zoom lens 30, but can be obtained from a result of detection which is performed on the rotation of the rotating barrel 20 that rotates in conjunction with the movement of the zoom lens 30.

In contrast, the position, which is detected by the first lens position detection section 71, can be obtained from a result of detection which is directly performed on the position of the zoom lens 30 by the Hall IC 23. Accordingly, the reliability of the position of the zoom lens 30, which is detected by the first lens position detection section 71, is higher than the reliability of the position of the zoom lens 30 which is detected by the second lens position detection section 72 in a state where the zoom ring 9 is not rotated after power is supplied.

Therefore, in the lens device 2, the control section 73 selectively performs first control for outputting information about the position of the zoom lens 30 detected by the first lens position detection section 71 or second control for outputting information about the position of the zoom lens 30 detected by the second lens position detection section 72. If power is supplied to the lens device 2, first, the control section 73 performs the first control, thereafter performs the second control after the zoom ring 9 is rotated.

The information about the position of the zoom lens 30, which is output by the control section 73, is transmitted to the imaging apparatus 1 of FIG. 1. Then, the control section in the imaging apparatus 1 displays the information about the zoom position on the display section based on the received information, or corrects chromatic aberration based on the information.

The information about the position of the zoom lens 30, which is output by the control section 73, may be used for control in the lens device 2, and may be transmitted to a controller (lens operation device) provided separately from the lens device 2 and the imaging apparatus 1 and may be used for control in the controller.

Hereinafter, operations of the lens device 2 and the imaging apparatus 1 shown in FIG. 1 will be described.

Figure 9:
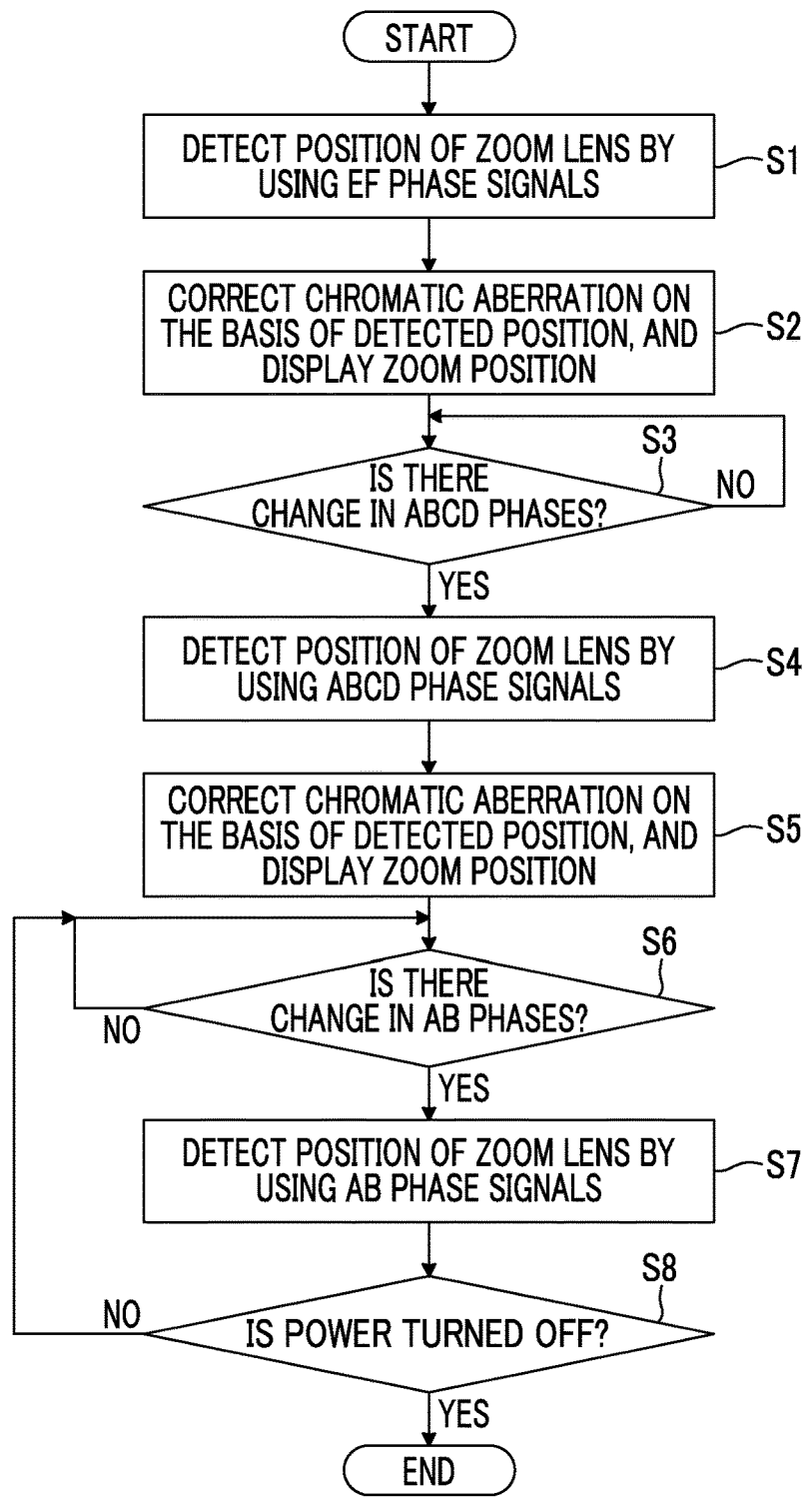
FIG. 9 is a flowchart for explaining operations of the lens device 2 shown in FIG. 1.

FIG. 9 is a flowchart for explaining the operations of the lens device 2 shown in FIG. 1.

If power is supplied to the lens device 2, the first lens position detection section 71 detects the position of the zoom lens 30 based on the E phase signal and the F phase signal obtained from the Hall IC 23 (step S1).

After step S1, the control section 73 acquires the information about the detected position from the first lens position detection section 71, and outputs the information to the imaging apparatus 1. In the imaging apparatus 1, based on the information received from the lens device 2, the zoom position is displayed on a display section, and chromatic aberration is corrected in accordance with the zoom position (step S2).

After step S2, the second lens position detection section 72 determines, for example, whether or not there is change in output signals of the A/D converters 61A to 61D after power is supplied and the phase of the C phase signal among the ABCD phases is 0° or 180° (step S3).

If the zoom ring 9 is rotated by a user so as to be oriented in one direction and there is change in the output signals of the A/D converters 61A to 61D (step S3: YES), the second lens position detection section 72 calculates the phase difference θ2 by using the A, B, C, and D phases, and detects the position of the zoom lens 30 from the calculated phase difference θ2 (step S4).

After step S4, the control section 73 causes the second lens position detection section 72 to acquire the information about the detected position, and outputs the information to the imaging apparatus 1. In the imaging apparatus 1, based on the received information, the zoom position is displayed on a display section, and chromatic aberration is corrected in accordance with the zoom position (step S5).

After step S5, the second lens position detection section 72 determines whether there is change in the output signals (AB phases) of the A/D converters 61A and 61B (step S6). If there is change in AB phases, the second lens position detection section 72 counts the number of pulses in accordance with the change, adds or subtracts the distance corresponding to the counted number of pulses to or from the position which is detected in step S4, and detects the position of the zoom lens 30 (step S7). Here, the information about the detected position is output to the imaging apparatus 1 by the control section 73.

After step S7, if power of the lens device 2 is turned off, the processing is terminated, and if power is turned on, the processing returns to step S6.

As described above, according to the lens device 2, after power is supplied, the first lens position detection section 71 outputs the information about the detected position to the imaging apparatus 1. Hence, even in a state where the zoom ring 9 is not rotated immediately after power is supplied, it is possible to display a rough zoom position on the display section of the imaging apparatus 1 or correct chromatic aberration.

Further, according to lens device 2, after the first lens position detection section 71 detects the position of the zoom lens 30, the zoom ring 9 is rotated, and subsequently the information about the position of the zoom lens 30 detected by the second lens position detection section 72 is output to the imaging apparatus 1. Hence, by using the information about the position detected with a high resolving power after the rotation of the zoom ring 9, the zoom position is displayed, the chromatic aberration is corrected, and the slow zoom function and the like are implemented.

As described above, after the zoom ring 9 is rotated, the information about the position detected by the second lens position detection section 72 is output. Thus, it is not necessary for the first lens position detection section 71 to have a high resolving power.

For example, if a multi-polar magnet is used instead of the magnet 34 so as to increase the detection resolving power of the first lens position detection section 71, a length of the rotating barrel 20 in the optical axis direction increases. As a result, this inhibits reduction in size of the lens device 2, or it is difficult for this configuration to be applied to an interchangeable lens. However, according to the lens device 2 of FIG. 1, it is possible to use the first lens position detection section 71 having a low detection resolving power. Thus, this configuration reduces the size thereof and is easily compatible with the interchangeable lens.

In the above description, the magnet 34 is fixed onto the zoom lens holding section 31, and the Hall IC 23 is fixed onto the housing 10. However, a configuration in which the Hall IC 23 is fixed on the zoom lens holding section 31 and the magnet 34 is fixed onto the housing 10 may be adopted.

In the above description, after the zoom position is displayed in step S2 of FIG. 9, by rotating the zoom ring 9, the zoom position is likely to rapidly change in step S5. Hence, in step S4, first, the position information about the position detected in step S1 and the position detected in step S4 is output to the imaging apparatus 1, and thereafter the information about the position detected in step S4 is output. Thereby, it is possible to change the display of the zoom position without sense of incongruity.

Figure 10:
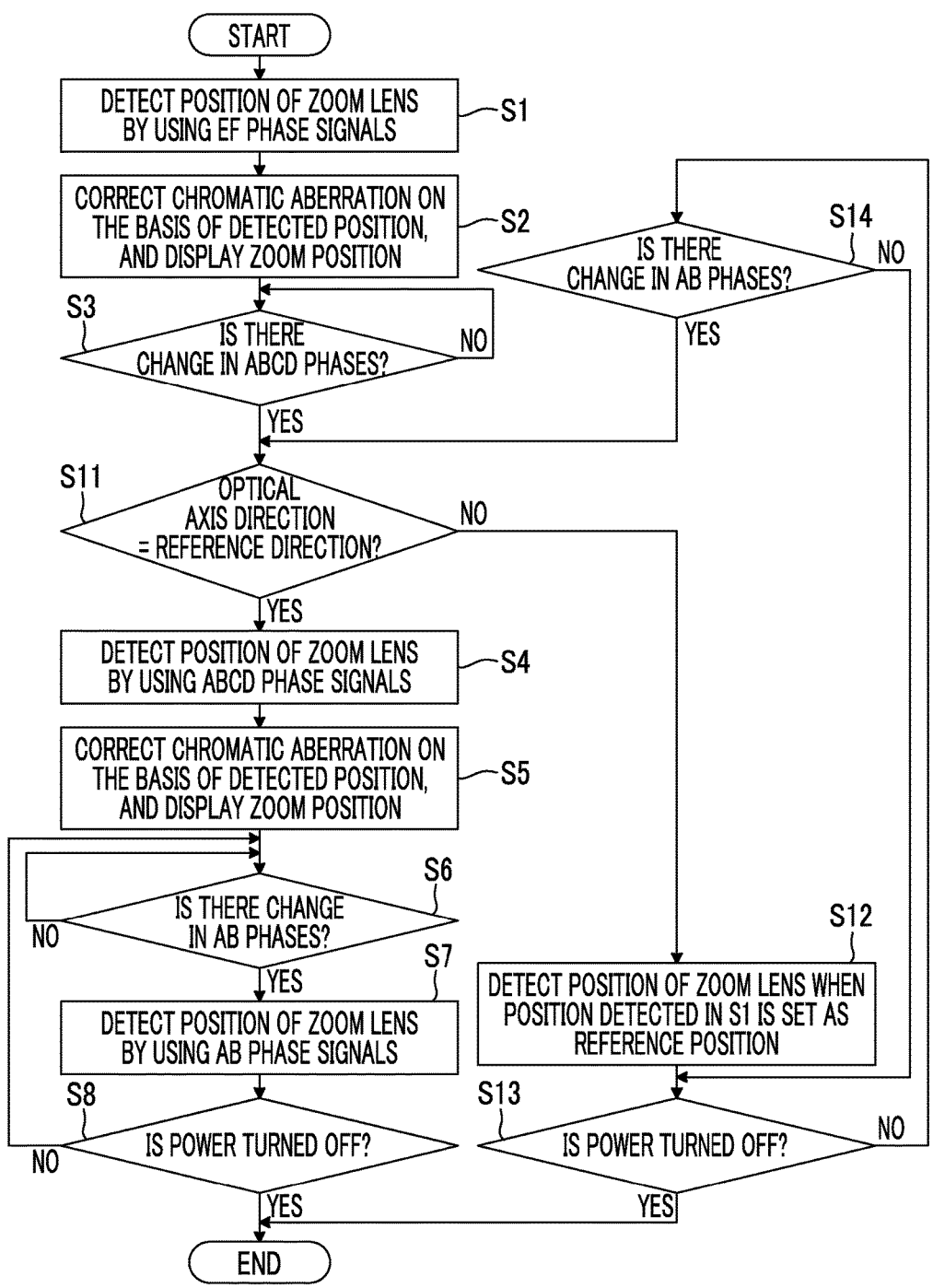
FIG. 10 is a flowchart illustrating a modification example of the operations of the lens device 2 of FIG. 1.

FIG. 10 is a flowchart illustrating a modification example of the operations of the lens device 2 of FIG. 1. In FIG. 10, processes, which are the same as those in FIG. 9, are represented by the same reference numerals and signs, and the description thereof will be omitted.

If the position of the zoom lens 30 is detected in step S2 and thereafter the determination of step S3 is YES, the control section 73 determines whether or not the direction of the optical axis of the lens device 2 is same as a reference direction which is a direction as a reference (step S11). The control section 73 functions as a direction determination section.

The magnetic recording member 40 is fixed along the outer circumference of the rotating barrel 20, and there is a mechanical backlash between the rotating barrel 20 and the magnetic sensor section 50. Further, this backlash changes in accordance with the direction of the optical axis of the lens device 2. For example, the backlash drastically changes in accordance with whether the direction of the optical axis is vertical to or parallel with the direction of gravity.

In the present embodiment, at the time of producing the lens device 2, data, which indicates a relationship between the phase difference $\theta 1$ and the position of the zoom lens 30, is calculated through actual measurement. The data is, for example, data which is acquired in a state where the optical axis direction of the lens device 2 is vertical to the direction of gravity. The direction of the optical axis of the lens device 2 when the data is acquired is assumed as the reference direction. If the direction of the optical axis of the lens device 2 is different from the reference direction, reliability of the data is lowered by the change in backlash.

In the present embodiment, in a case where an angle formed between the reference direction and the optical axis direction of the lens device 2 is greater than a threshold value TH1, it is determined that the optical axis direction of the lens device 2 is different from the reference direction. In a case where the angle formed between the reference direction and the optical axis direction of the lens device 2 is equal to or less than a threshold value TH1, it is determined that the optical axis direction of the lens device 2 is same as the reference direction.

In addition, the optical axis direction of the lens device 2 may be detected using posture detection means such as an electronic level provided in the lens device 2.

When the determination in step S11 is YES, it is determined that reliability of the data, which indicates the relationship between the phase difference $\theta 2$ and the position of the zoom lens 30, is high. Hence, the second lens position detection section 72 calculates the phase difference $\theta 2$ from the A, B, C, and D phases, and thereby detecting the position of the zoom lens 30 (the reference position for increment) from the phase difference $\theta 2$ and the data (step S4). The subsequent operations are same as those of FIG. 9.

When the determination in step S11 is NO, it is determined that reliability of the data, which indicates the relationship between the phase difference $\theta 2$ and the position of the zoom lens 30, is low. Hence, the second lens position detection section 72 sets the reference position, which is obtained when the increment is performed, to the position, which is detected in step S1, and detects the position, which is subjected to the increment from the reference position, as the position of the zoom lens 30 in accordance with the change in A phase signal or B phase signal (step S12). After step S12, in step S13, it is determined whether power is turned off.

If power is not turned off, it is determined whether there is change in the A phase signal and the B phase signal (step S14). In a case where there is change, the processing returns to step S11. In a case where there is no change, the processing returns to step S13.

As described above, in a case where the direction of the optical axis of the lens device 2 is different from the reference direction, after the zoom ring 9 is rotated, the position of the zoom lens 30 detected by the first lens position detection section 71 is set as the reference position and is incremented by the second lens position detection section 72, and the position of the zoom lens 30 is detected. As a result, it is possible to perform position detection at high accuracy.

It should be noted that whenever the direction of the optical axis of the lens device 2 is changed multiple times, the data, which indicates a relationship between the phase difference $\theta 2$ and the position of the zoom lens 30, is acquired, and used data is changed in accordance with the direction of the optical axis of the lens device 2 in use. In such a manner, it is possible to obtain a sufficient accuracy in position detection even in the embodiment of FIG. 9. However, in this case, an amount of the work at the time of manufacturing the lens device 2 increases, or an amount of data stored in the lens control device 70 increases. According to the embodiment of FIG. 10, there is no problem mentioned above, and cost reduction of the lens device 2 can be achieved.

It should be noted that, even when the physical posture detection means is not used, it is possible to determine whether the direction of the optical axis of the lens device 2 coincides with the reference direction.

For example, at the time of manufacturing the lens device 2, while the position of the zoom lens 30 is changed, first angle information (phase difference $\theta 1$) corresponding to each position is generated from the signal which is detected by the Hall IC 23 at each position, second angle information (phase difference $\theta 2$) corresponding to each position is generated from the signal which is detected by the magnetic sensor section 50 at each position, and the information pieces are stored, in association with each other, in a storage section of the lens control device 70. Then, at the time of using the lens device 2, when the determination in step S3 of FIG. 10 is YES, the control section 73 causes the first lens position detection section 71 to calculate the phase difference $\theta 1$, and causes the second lens position detection section 72 to calculate the phase difference $\theta 2$.

Then, the control section 73 acquires the phase difference $\theta 2$, which is associated with the calculated phase difference $\theta 1$, from the storage section, and calculates a difference between the acquired phase difference $\theta 2$ and the calculated phase difference $\theta 2$. When the difference is equal to or greater than a threshold value TH2, the control section 73 determines that there is an error in the phase difference $\theta 2$, that is, it is determined that the direction of the optical axis of the lens device 2 does not coincide with the reference direction.

Further, when the difference is less than the threshold value TH2, the control section 73 determines that there is no error in the phase difference θ2, that is, it is determined that the direction of the optical axis of the lens device 2 coincides with the reference direction.

As described above, the direction of the optical axis of the lens device 2 is determined using the phase difference θ1 and the phase difference θ2. Thereby, a physical sensor is not necessary, and cost reduction can be achieved.

Figure 11:
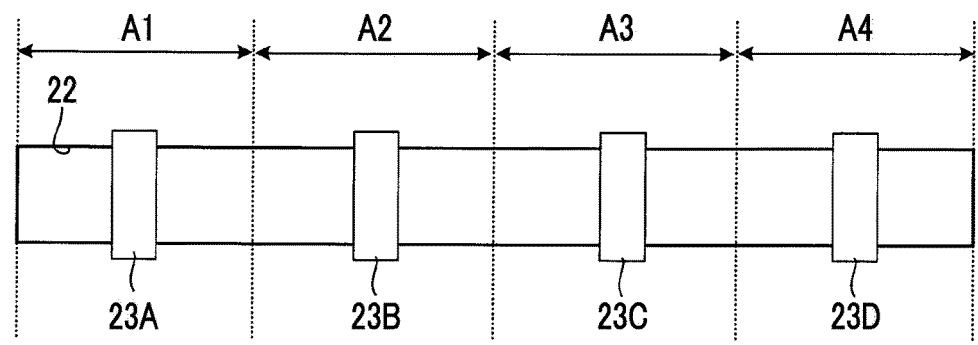
FIG. 11 is a diagram illustrating an example in which the number of Hall ICs facing an opening 22 of the housing 10 is not one but four.

FIG. 11 is a diagram illustrating an example in which the number of Hall ICs facing the opening 22 of the housing 10 is not one but four.

As shown in FIG. 11, four Hall ICs 23A, 23B, 23C, and 23D are provided with intervals in the optical axis direction at positions where the Hall ICs face the opening 22, on the outer circumference of the housing 10.

All the Hall ICs 23A, 23B, 23C, and 23D have same configuration as the Hall IC 23, and two signals (the E phase and the F phase), of which phases are different, are detected in accordance with passage of the magnet 34.

As described above, the reason why the plurality of Hall ICs is provided is because a distance of movement of the zoom lens 30 is long in the lens device on which a high-power zoom lens is mounted and the accuracy in position detection cannot be obtained from only one Hall IC.

The Hall IC 23A is disposed in a region A1 among regions which are obtained by dividing the movable range of the zoom lens 30 into four parts.

The Hall IC 23B is disposed in a region A2 among regions which are obtained by dividing the movable range of the zoom lens 30 into four parts.

The Hall IC 23C is disposed in a region A3 among regions which are obtained by dividing the movable range of the zoom lens 30 into four parts.

The Hall IC 23D is disposed in a region A4 among regions which are obtained by dividing the movable range of the zoom lens 30 into four parts.

After power is supplied, based on the position of the zoom lens 30 which is detected by the second lens position detection section 72 in a state where the zoom ring 9 is not rotated, the first lens position detection section 71 specifies a Hall IC corresponding to the position (that is present in a region including the position), among the Hall ICs 23A to 23D, calculates the phase difference θ1 from the signal detected by the specified Hall IC, and detects the position of the zoom lens 30 from the phase difference θ1.

Figure 12:
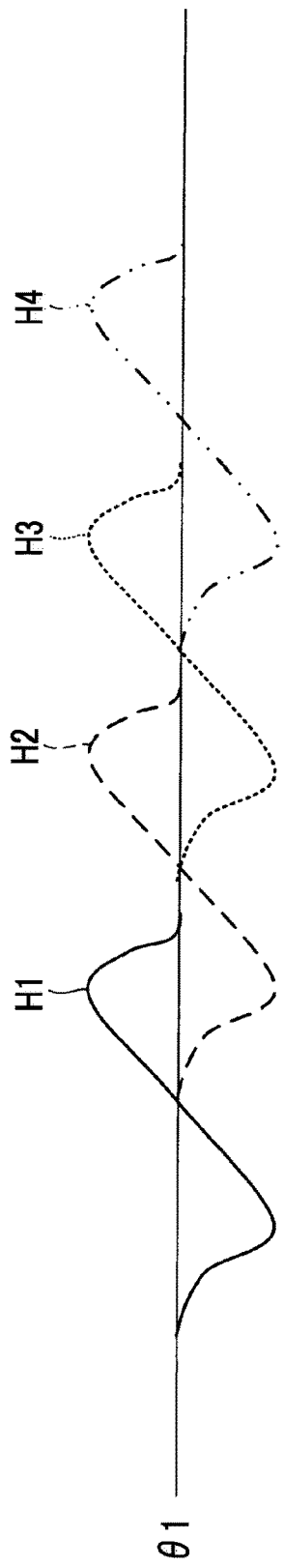
FIG. 12 is a diagram illustrating values of a phase difference θ1 which is calculated from a detected signal of each Hall IC of FIG. 11 at each position of the zoom lens 30.

FIG. 12 is a diagram illustrating values of a phase difference θ1 which is calculated from a detected signal of each Hall IC of FIG. 11 at each position of the zoom lens 30. The reference sign H1 indicates the phase difference θ1 which is calculated from the signal detected by the Hall IC 23A. The reference sign H2 indicates the phase difference θ1 which is calculated from the signal detected by the Hall IC 23B. The reference sign H3 indicates the phase difference θ1 which is calculated from the signal detected by the Hall IC 23C. The reference sign H4 indicates the phase difference θ1 which is calculated from the signal detected by the Hall IC 23D.

As shown in FIG. 12, in accordance with the position of the zoom lens 30, all the phase differences θ1 calculated from the signals detected by the respective Hall ICs may be zero. In such a case, the position of the zoom lens 30 cannot be specified.

Although detection accuracy is low in a state where the zoom ring 9 is not rotated after power is supplied, the second lens position detection section 72 is able to detect where in the regions A1 to A4 of the zoom lens 30 is present.

Accordingly, any one of the regions A1 to A4 is specified from the position of the zoom lens 30 detected by the second lens position detection section 72, and the position of the zoom lens 30 is detected by the first lens position detection section 71 using the output of the Hall IC present in the specified region. In such a manner, even in a case where the plurality of Hall ICs is provided, it is possible to perform position detection with high accuracy.

Figure 13:
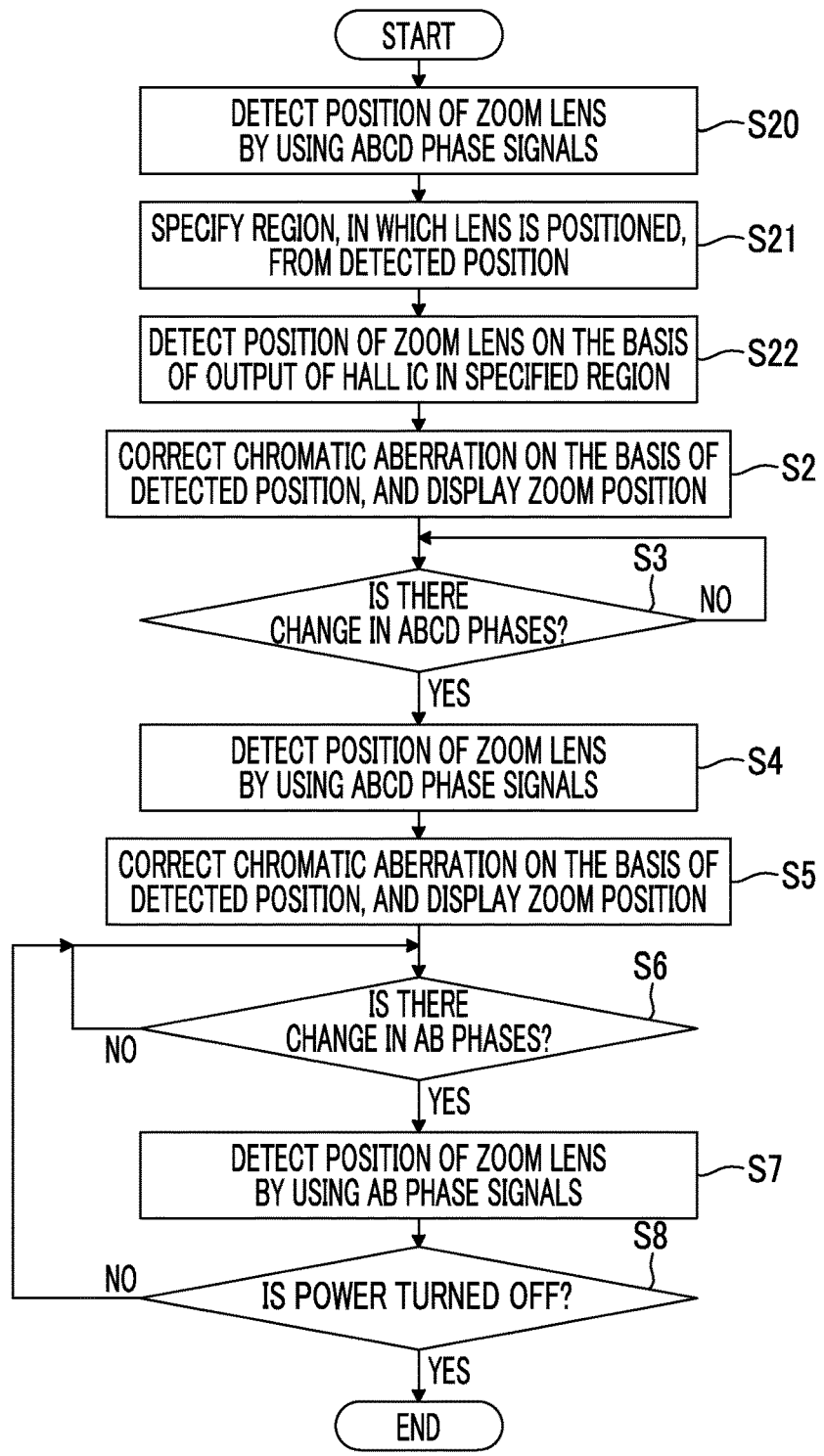
FIG. 13 is a flowchart for explaining the operations of the lens device 2 equipped with the housing 10 shown in FIG. 11.

FIG. 13 is a flowchart for explaining the operations of the lens device 2 equipped with the housing 10 shown in FIG. 11. In FIG. 13, processes, which are same as those in FIG. 9, are represented by the same reference numerals and signs, and the description thereof will be omitted.

If power is supplied to the lens device 2, the second lens position detection section 72 calculates the phase difference θ2 by suing the A, B, C, and D phases, and detects the position of the zoom lens 30 from the calculated phase difference θ2 (step S20).

Next, the first lens position detection section 71 specifies a region, in which the zoom lens 30 is positioned, among the regions A1 to D1, based on the position of the zoom lens 30 detected in step S20 (step S21).

Next, the first lens position detection section 71 acquires the signal detected by the Hall IC disposed in the region which is specified in step S21, and calculates the phase difference θ1 from the acquired detected signal, and detects the position of the zoom lens 30 from the calculated phase difference θ1 (step S22). The subsequent operations are same as those in step S2 and following steps of FIG. 9.

As described above, by using the information about the position of the zoom lens 30 detected by the second lens position detection section 72, it is determined which one of the signals detected by the plurality of Hall ICs is used in order to detect the zoom lens position. Thereby, it is possible to increase the accuracy of the zoom lens position detected by the first lens position detection section 71.

Figure 14:
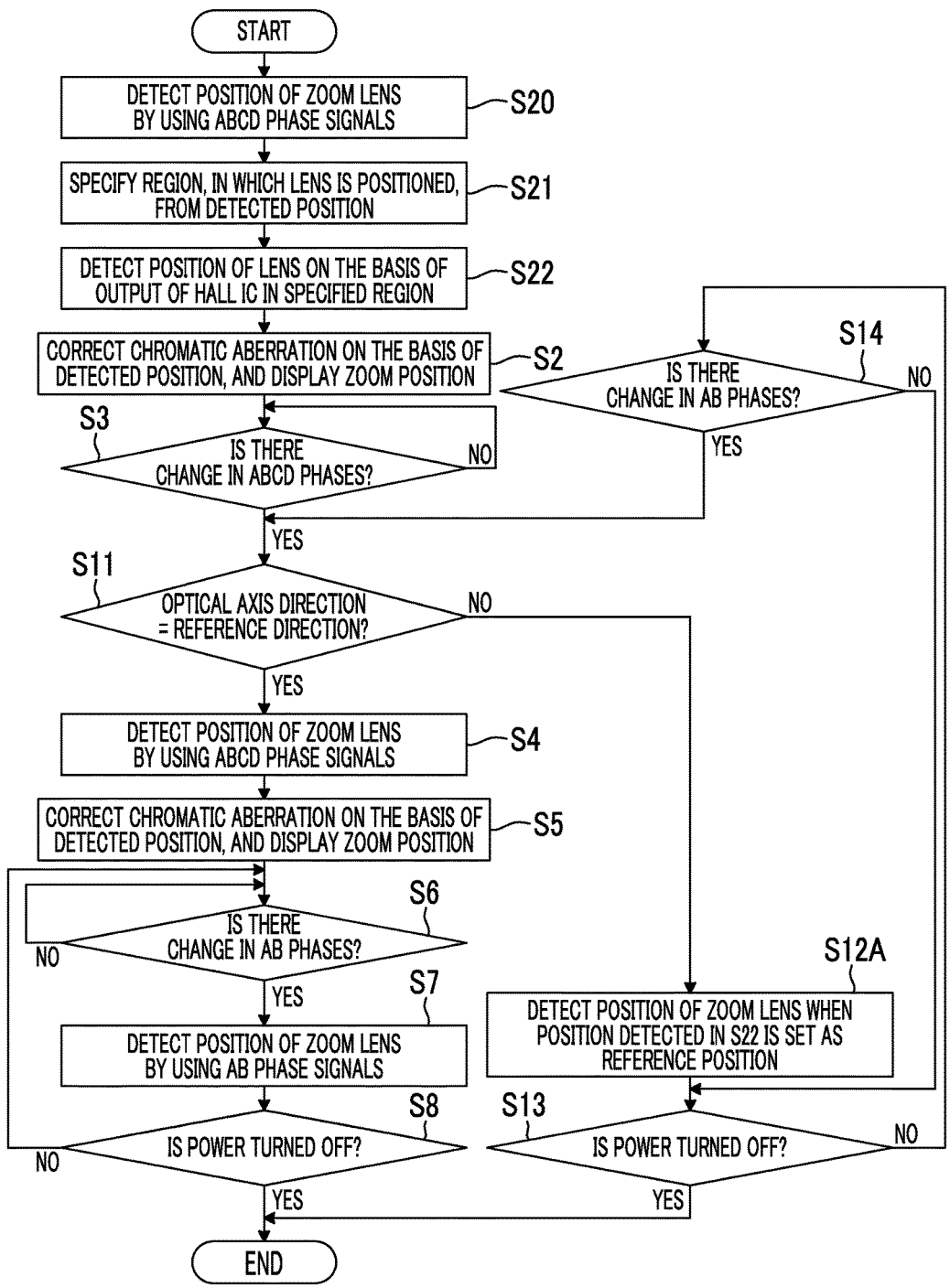
FIG. 14 is a flowchart illustrating a modification example of the operations of the lens device 2.

FIG. 14 is a flowchart illustrating a modification example of the operations of the lens device 2. In the flowchart of FIG. 14, step S1 in FIG. 10 is replaced with steps S20 to S22 of FIG. 13, and step S12 is replaced with step S12A. Accordingly, only step S12A will be described.

In step S12A, the second lens position detection section 72 sets the reference position, which is obtained when the increment is performed, to the position, which is detected in step S22, and detects the position, which is subjected to the increment from the reference position, as the position of the zoom lens 30 in accordance with the change in A phase signal or B phase signal.

As described above, it is possible to perform the zoom position detection with higher accuracy through combination between the embodiment of FIG. 10 and the embodiment of FIG.

In the lens device 2, the two signals of the magnetic sensor section 50 and the Hall IC 23 are provided in the vicinity of the rotating barrel 20. Since both the magnetic sensor section 50 and the Hall IC 23 are configured to detect magnetism, it is preferable that the distance between the magnetic sensor section 50 and the Hall IC 23 is set to be large so as not to interfere with each other.

Further, it is preferable that the distance between the Hall IC 23 and the magnetic recording member 40 is set to be sufficiently large or a magnetic shield is provided between the opening 22 and the magnetic recording member 40 such that the Hall IC 23 does not detect the magnetic information of the magnetic recording member 40.

In the above description, the Hall IC 23 is used as the first signal detection section. However, as the first signal detection section, a different thing may be used if it is able to detect a signal which changes in accordance with the position of the zoom lens 30. For example, the potentiometer may be used. In a manner similar to the Hall IC 23, by detecting the signal without contact with the zoom lens holding section 31, it is possible to prevent the foreign matters from entering into the rotating barrel 20, and it is possible to prevent video image quality from being lowered.

As an example of the movable lens, the zoom lens has been hitherto used, but the present invention can be applied to, for example, a focus lens.

As described above, the present description discloses the following items.

The disclosed lens device comprises: a lens that is movable in an optical axis direction; a rotating member that rotates in conjunction with movement of the lens in the optical axis direction; a first signal detection section that detects a signal which changes in accordance with a position of the lens in the optical axis direction; a second signal detection section that detects a signal which change in accordance with an amount of rotation of the rotating member; a first lens position detection section that detects the position of the lens based on the signal detected by the first signal detection section; a second lens position detection section that detects the position of the lens based on the signal detected by the second signal detection section; and a control section that performs first control for outputting information of the position of the lens, which is detected by the first lens position detection section, and thereafter performs second control for outputting information of the position of the lens, which is detected by the second lens position detection section, if power is supplied.

The disclosed lens device further comprises a direction determination section that determines whether or not a direction of an optical axis of the lens device is same as a reference direction. In a case where the direction determined by the direction determination section is different from the reference direction, after the rotating member rotates, the second lens position detection section sets the position of the lens, which is detected by the first lens position detection section after power is supplied, as a reference position, and detects the position of the lens by detecting an amount of displacement from the reference position based on the signal which is detected by the second signal detection section in accordance with rotation of the rotating member. In a case where the direction determined by the direction determination section is same as the reference direction, after the rotating member rotates, the second lens position detection section detects the position of the lens based on the signal which is detected by the second signal detection section.

In the disclosed lens, the first signal detection section detects two signals of which phases fluctuating in accordance with the position of the lens deviate. The second signal detection section includes a first magnetic recording member and a second magnetic recording member, which are fixed onto the rotating member in accordance with a rotation direction of the rotating member and in which magnetic signals respectively having different wavelengths are recorded, and a sensor section that detects a first signal, which corresponds to a magnetic signal having a first wavelength recorded in the first magnetic recording member, and a second signal, of which a phase deviates from that of the first signal, and detects a third signal, which corresponds to a magnetic signal having a second wavelength recorded in the second magnetic recording member and different from that of the first wavelength, and a fourth signal of which a phase deviates from the third signal. The lens device further comprises a storage section that stores, at each of positions obtained whenever the position of the lens in the optical axis direction is changed, first angle information, which corresponds to each of the positions calculated from the signals detected by the first signal detection section, and second angle information, which corresponds to each of the positions calculated from the signal detected by the sensor section, in association with each other. The direction determination section determines that the direction of the optical axis of the lens device is different from the reference direction when a difference between the second angle information, which is stored in the storage section in association with the first angle information calculated from the signal detected by the first signal detection section, and the second angle information, which is calculated from the signal detected by the sensor section, is equal to or greater than a threshold value, and determines that the direction of the optical axis of the lens device is same as the reference direction when the difference is less than the threshold value.

In the disclosed lens device, the first signal detection section includes a magnet that is fixed onto the lens, and a plurality of magnetic detection sections that are provided with intervals interposed therebetween in the optical axis direction at positions facing a region through which the magnet passes when the lens moves in the optical axis direction. Until the rotating member rotates after power is supplied to the lens device, the first lens position detection section specifies a magnetic detection section, which corresponds to the position of the lens detected by the second lens position detection section, among the plurality of magnetic detection sections, based on the position, and detects the position of the lens based on a signal detected by the specified magnetic detection section.

The disclosed imaging apparatus comprises: the lens device, and an imaging element that captures an image of a subject through the lens device.

The disclosed method of detecting a position of a movable lens, the method comprises: a first signal detection step of detecting a signal changing in accordance with a position of a lens which is mounted on a lens device and is movable in an optical axis direction; a second signal detection step of detecting a signal changing in accordance with an amount of rotation of the rotating member which rotates in conjunction with movement of the lens in the optical axis direction; a first lens position detection step of detecting the position of the lens based on the signal detected in the first signal detection step; a second lens position detection step of detecting the position of the lens based on the signal detected in the second signal detection step; and a control step of performing first control for outputting information of the position of the lens, which is detected in the first lens position detection step, and thereafter performs second control for outputting information of the position of the lens, which is detected in the second lens position detection step, after the rotating member rotates, if power is supplied to the lens device.

The present invention is highly convenient and effective when applied to an imaging module mounted on a portable terminal such as a smartphone.

The present invention has been hitherto described with reference to the specific embodiments. However, the present invention is not limited to the embodiments, and may be modified into various forms without departing from the technical scope of the present invention.

The present application is based on Japanese Patent Application (JP2014-054994A) filed on Mar. 18, 2014, the content of which is incorporated herein by reference.

EXPLANATION OF REFERENCES 1 imaging apparatus
2 lens device
20 rotating barrel (rotating member)
21 cam groove
22 opening
23, 23A, 23B, 23C, 23D Hall IC (first signal detection section)
30 zoom lens
31 zoom lens holding section
32 protrusion portion
34 magnet
40, 41, 42 magnetic recording member
50 magnetic sensor section (second signal detection section)
71 first lens position detection section
72 second lens position detection section
73 control section (direction determination section)

What is claimed is:

1. A lens device comprising:
a lens that is movable in an optical axis direction;
a rotating member that rotates in conjunction with movement of the lens in the optical axis direction;
a first signal detection section that detects a signal which changes in accordance with a position of the lens in the optical axis direction;
a second signal detection section that detects a signal which changes in accordance with an amount of rotation of the rotating member;
a first lens position detection section that detects the position of the lens based on the signal detected by the first signal detection section;
a second lens position detection section that detects the position of the lens based on the signal detected by the second signal detection section;
a control section that performs first control for outputting information of the position of the lens, which is detected by the first lens position detection section, and thereafter performs second control for outputting information of the position of the lens, which is detected by the second lens position detection section, if power is supplied; and
a direction determination section that determines whether or not a direction of an optical axis of the lens device is same as a reference direction,
wherein in a case where the direction determined by the direction determination section is different from the reference direction, after the rotating member rotates, the second lens position detection section sets the position of the lens, which is detected by the first lens position detection section after power is supplied, as a reference position, and detects the position of the lens by detecting an amount of displacement from the reference position based on the signal which is detected by the second signal detection section in accordance with rotation of the rotating member, and
wherein in a case where the direction determined by the direction determination section is same as the reference direction, after the rotating member rotates, the second lens position detection section detects the position of the lens based on the signal which is detected by the second signal detection section.

2. The lens device according to claim 1,
wherein the first signal detection section detects two signals of which phases fluctuating in accordance with the position of the lens deviate from each other,
wherein the second signal detection section includes a first magnetic recording member and a second magnetic recording member, which are fixed onto the rotating member in accordance with a rotation direction of the rotating member and in which magnetic signals respectively having different wavelengths are recorded, and a sensor section that detects a first signal, which corresponds to a magnetic signal having a first wavelength recorded in the first magnetic recording member, and a second signal, of which a phase deviates from that of the first signal, and detects a third signal, which corresponds to a magnetic signal having a second wavelength recorded in the second magnetic recording member and different from the first wavelength, and a fourth signal of which a phase deviates from that of the third signal,
wherein the lens device further comprises a storage section that stores, at each of positions obtained whenever the position of the lens in the optical axis direction is changed, first angle information, which corresponds to each of the positions calculated from the signals detected by the first signal detection section, and second angle information, which corresponds to each of the positions calculated from the signal detected by the sensor section, in association with each other, and
wherein the direction determination section determines that the direction of the optical axis of the lens device is different from the reference direction when a difference between the second angle information, which is stored in the storage section in association with the first angle information calculated from the signal detected by the first signal detection section, and the second angle information, which is calculated from the signal detected by the sensor section, is equal to or greater than a threshold value, and determines that the direction of the optical axis of the lens device is same as the reference direction when the difference is less than the threshold value.

3. The lens device according to claim 1,
wherein the first signal detection section includes a magnet that is fixed onto the lens, and a plurality of magnetic detection sections that are provided with intervals interposed therebetween in the optical axis direction at positions facing a region through which the magnet passes when the lens moves in the optical axis direction, and
wherein until the rotating member rotates after power is supplied to the lens device, the first lens position detection section specifies a magnetic detection section, which corresponds to the position of the lens detected by the second lens position detection section, among the plurality of magnetic detection sections, based on the position, and detects the position of the lens based on a signal detected by the specified magnetic detection section.

4. The lens device according to claim 2,
wherein the first signal detection section includes a magnet that is fixed onto the lens, and a plurality of magnetic detection sections that are provided with intervals interposed therebetween in the optical axis direction at positions facing a region through which the magnet passes when the lens moves in the optical axis direction, and
wherein until the rotating member rotates after power is supplied to the lens device, the first lens position detection section specifies a magnetic detection section, which corresponds to the position of the lens detected by the second lens position detection section, among the plurality of magnetic detection sections, based on the position, and detects the position of the lens based on a signal detected by the specified magnetic detection section.

5. An imaging apparatus comprising:
the lens device according to claim 1; and
an imaging element that captures an image of a subject through the lens device.

6. A method of detecting a position of a movable lens, the method comprising:
a first signal detection step of detecting a signal changing in accordance with a position of a lens which is mounted on a lens device and is movable in an optical axis direction;
a second signal detection step of detecting a signal changing in accordance with an amount of rotation of a rotating member which rotates in conjunction with movement of the lens in the optical axis direction;
a first lens position detection step of detecting the position of the lens based on the signal detected in the first signal detection step;
a second lens position detection step of detecting the position of the lens based on the signal detected in the second signal detection step;
a control step of performing first control for outputting information of the position of the lens, which is detected in the first lens position detection step, and thereafter performing second control for outputting information of the position of the lens, which is detected in the second lens position detection step, after the rotating member rotates, if power is supplied to the lens device; and
a direction determination step of determining whether or not a direction of an optical axis of the lens device is same as a reference direction,
wherein in a case where the direction determined by the direction determination step is different from the reference direction, after the rotating member rotates, the second lens position detection step sets the position of the lens, which is detected by the first lens position detection step after power is supplied, as a reference position, and detects the position of the lens by detecting an amount of displacement from the reference position based on the signal which is detected by the second signal detection step in accordance with rotation of the rotating member, and
wherein in a case where the direction determined by the direction determination step is same as the reference direction, after the rotating member rotates, the second lens position detection step detects the position of the lens based on the signal which is detected by the second signal detection step.

\* \* \* \* \*